(12) United States Patent
Deng et al.

(10) Patent No.: US 11,583,964 B2
(45) Date of Patent: Feb. 21, 2023

(54) ATTACHING APPARATUS

(71) Applicants: CHENGDU BOE OPTOELECTRONICS TECHNOLOGY CO., LTD., Sichuan (CN); BOE TECHNOLOGY GROUP CO., LTD., Beijing (CN)

(72) Inventors: Jia Deng, Beijing (CN); Haitao Liang, Beijing (CN); Jialin Wang, Beijing (CN); Shanmao Peng, Beijing (CN)

(73) Assignees: CHENGDU BOE OPTOELECTRONICS TECHNOLOGY CO., LTD., Sichuan (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 17/504,621

(22) Filed: Oct. 19, 2021

(65) Prior Publication Data

US 2022/0126408 A1    Apr. 28, 2022

(30) Foreign Application Priority Data

Oct. 22, 2020    (CN) .......................... 202011140571.7

(51) Int. Cl.
*B23P 19/04*    (2006.01)
*G09F 9/30*    (2006.01)

(52) U.S. Cl.
CPC .................................. *B23P 19/04* (2013.01)

(58) Field of Classification Search
CPC ......... B23P 19/04; G09F 9/301; B29C 66/832
See application file for complete search history.

(56) References Cited

U.S. PATENT DOCUMENTS

| 11,104,110 | B2 * | 8/2021 | Zhang | ................. B32B 37/0053 |
| 2018/0301643 | A1 * | 10/2018 | Xu | ........................... H01L 51/56 |
| 2019/0051847 | A1 * | 2/2019 | Wang | ....................... H01F 1/117 |
| 2019/0299582 | A1 * | 10/2019 | Zheng | ................. B32B 37/1018 |

(Continued)

FOREIGN PATENT DOCUMENTS

| CN | 111862797 A | * | 10/2020 | ............. G09F 9/301 |
| CN | 110303450 B | * | 5/2021 | ............... B06B 1/08 |
| CN | 113053245 A | * | 6/2021 | ............... G09F 9/30 |

(Continued)

OTHER PUBLICATIONS

Tang et al.; Laminating method, laminating equipment and readable storage medium; EPO English Machine Translation; Oct. 30, 2020; pp. 1-55 (Year: 2021).*

*Primary Examiner* — Bayan Salone (74) *Attorney, Agent, or Firm* — Dority & Manning, P.A.

(57) ABSTRACT

An attaching apparatus includes a cover plate fixing part and two slideable press heads. The cover plate fixing part is configured to fix a curved cover plate. The two slideable press heads are arranged at a side, configured to fix the curved cover plate, of the cover plate fixing part. Each slideable press head includes an elastic cushion configured to support a flexible display panel. The two slideable press heads are configured to be capable of moving proximate to or far away from each other, and driving the flexible display panel to be pressed and attached to an attaching surface of the curved cover plate in a process that the two slideable press heads move far away from each other.

20 Claims, 5 Drawing Sheets

(56) References Cited

U.S. PATENT DOCUMENTS

2019/0315111 A1* 10/2019 Chen .................. B32B 37/1284
2019/0329540 A1* 10/2019 Kim ................... B32B 38/0012

FOREIGN PATENT DOCUMENTS

| CN | 113097122 A | * | 7/2021 |
| CN | 113153876 A | * | 7/2021 |
| CN | 113436534 A | * | 9/2021 |

* cited by examiner

ATTACHING APPARATUS

CROSS-REFERENCE TO RELATED APPLICATION

This application claims priority to Chinese Patent Application No. 202011140571.7, filed on Oct. 22, 2020, which is incorporated herein by reference in its entirety.

TECHNICAL FIELD

The present disclosure relates to the field of display panel manufacturing technologies, and in particular, to an attaching apparatus.

BACKGROUND

A curved display screen generally includes a flexible display panel and a curved cover plate, and accordingly attaching the two is one of the manufacturing processes of the curved display screen. A special attaching apparatus is required to achieve the attaching of the flexible display panel and the curved cover plate.

SUMMARY

An attaching apparatus is provided. The attaching apparatus includes a cover plate fixing part and two slideable press heads. The cover plate fixing part is configured to fix a curved cover plate. The two slideable press heads are arranged at a side, configured to fix the curved cover plate, of the cover plate fixing part. Each slideable press head includes an elastic cushion configured to support a flexible display panel. The two slideable press heads are configured to be capable of moving proximate to or far away from each other, and driving the flexible display panel to be pressed and attached to an attaching surface of the curved cover plate in a process that the two slideable press heads move far away from each other.

In some embodiments, the slideable press head further includes a press head portion, and the elastic cushion is fixedly attached to the press head portion.

In some embodiments, the press head portion includes a horizontal extension sub-portion and a vertical extension sub-portion connected to an end of the horizontal extension sub-portion. The horizontal extension sub-portion is closer to the cover plate fixing part than the vertical extension sub-portion, and the elastic cushion is fixedly attached to the horizontal extension sub-portion. Ends, connected to corresponding vertical extension sub-portions, of horizontal extension sub-portions of press head portions of the two slidable press heads are proximate to each other.

In some embodiments, a surface, in contact with the elastic cushion, of the press head portion is a rough surface.

In some embodiments, the elastic cushion is silica gel formed through injection molding on the press head portion.

In some embodiments, the elastic cushion is made of silica gel or rubber.

In some embodiments, the attaching apparatus further includes a guide mechanism configured to guide a movement of a carrier film for fixing the flexible display panel. The slideable press head has a moulding surface. The guide mechanism has a moulding position in a motion path thereof, and the guide mechanism at the moulding position is capable of bringing a first main surface of the carrier film into contact with the moulding surface.

In some embodiments, the attaching apparatus further includes the carrier film. A second main surface, opposite to the first main surface, of the carrier film is configured to fix the flexible display panel.

In some embodiments, the slideable press head further has a first position for attaching a planar region and a second position for attaching a curved region in a motion path thereof. The guide mechanism is capable of driving the flexible display panel and the slideable press head to complete an attaching and moulding operation by using of the carrier film when the slideable press heads moving from the first position to the second position and the first main surface is in contact with the moulding surface.

In some embodiments, the moulding surface includes a planar moulding surface and a bent moulding surface. An end of the bent moulding surface is connected to the planar moulding surface, and another end of the bent moulding surface is a moulding end. The guide mechanism includes a contact end in contact with a portion, protruding from the bent moulding surface, of the carrier film. When the guide mechanism moves to the moulding position, a position where the contact end is in contact with the carrier film is a guide position, and the guide position is located at an end tangent plane where the slideable press head is tangent to the moulding end, or located between an end tangent plane where the slideable press head is tangent to the moulding end and the planar moulding surface.

In some embodiments, the slideable press head further has a bottom extension surface. The bottom extension surface extends from the moulding end toward a side away from the bent moulding surface. The bottom extension surface overlaps with the end tangent plane, or is closer to the planar moulding surface than the end tangent plane. The guide position is located at the bottom extension surface when the slideable press head moves to the second position.

In some embodiments, the slideable press head further has a slider connection surface. The slider connection surface is connected to an end, away from the bent moulding surface, of the bottom extension surface, and extends from the bottom extension surface in a direction facing away from the planar moulding surface. The guide position is located at a portion connected the bottom extension surface and the slider connection surface when the slideable press head moves to the second position.

In some embodiments, the slider connection surface and the bottom extension surface have a rounded corner therebetween, and the contact end is a circular arc protrusion matched with the rounded corner.

In some embodiments, a diameter of a circular arc of the contact end is equal to a difference between a diameter of the rounded corner and a thickness of the carrier film.

In some embodiments, the guide mechanism includes two guide clamps arranged corresponding to the two slideable press heads. Each guide clamp includes a guide member extending in a direction perpendicular to a movement direction of a slideable press head adjacent thereto. An end, proximate to the moulding surface, of the guide member is a contact end in contact with the carrier film when the guide mechanism moves to the moulding position.

In some embodiments, the guide clamp further includes a connection member connected to an end, away from the contact end, of the guide member. The connection member extending from the guide member in a movement direction of the adjacent slideable press head away from another slideable press head.

In some embodiments, the guide clamp further includes a fixing member extending in a direction parallel to the connection member. The fixing member is disposed on a surface, opposite to the guide member, of the connection member, and the fixing member cooperates with the connection member to clamp the carrier film.

In some embodiments, at least one of the cover plate fixing part and the slideable press head is configured to be capable of moving toward another, and there is an attaching position where the slideable press head moves at a concave side of the curved cover plate for attaching in a motion path of the at least one of the cover plate fixing part and the slideable press head. The guide member is located in a gap between the curved cover plate and the slideable press head when the slideable press head is located at the attaching position.

In some embodiments, the connection member is located outside a whole of the cover plate fixing part and the curved cover plate when the slideable press head is located at the attaching position.

In some embodiments, the cover plate fixing part is provided with a cover plate groove for accommodating the curved cover plate.

BRIEF DESCRIPTION OF THE DRAWINGS

In order to describe technical solutions in the present disclosure more clearly, the accompanying drawings to be used in some embodiments of the present disclosure will be introduced briefly below. However, the accompanying drawings to be described below are merely accompanying drawings of some embodiments of the present disclosure, and a person of ordinary skill in the art may obtain other drawings according to these drawings. In addition, the accompanying drawings in the following description may be regarded as schematic diagrams, but are not limitations on actual sizes of products, and actual processes of methods to which the embodiments of the present disclosure relate.

DETAILED DESCRIPTION

Technical solutions in some embodiments of the present disclosure will be described clearly and completely below with reference to the accompanying drawings. However, the described embodiments are merely some but not all embodiments of the present disclosure. All other embodiments obtained by a person of ordinary skill in the art on a basis of the embodiments of the present disclosure shall be included in the protection scope of the present disclosure.

Unless the context requires otherwise, throughout the specification and the claims, the term "comprise" and other forms thereof such as the third-person singular form "comprises" and the present participle form "comprising" are construed as open and inclusive, i.e., "including, but not limited to." In the description of the specification, the terms such as "one embodiment," "some embodiments," "exemplary embodiments," "example," "a specific example" or "some examples" are intended to indicate that specific features, structures, materials or characteristics related to the embodiment(s) or example(s) are included in at least one embodiment or example of the present disclosure. Schematic representations of the above terms do not necessarily refer to the same embodiment or example. In addition, the specific features, structures, materials, or characteristics may be included in any one or more embodiments or examples in any suitable manner.

Hereinafter, terms such as "first" and "second" are used for descriptive purposes only, and are not to be construed as indicating or implying relative importance or implicitly indicating the number of indicated technical features. Thus, features defined as "first" or "second" may explicitly or implicitly include one or more of the features. As used in this specification and the appended claims, the singular forms "a/an" and "the" may also include plural referents unless the content clearly dictates otherwise. In the description of the embodiments of the present disclosure, the term "a plurality of/the plurality of" means two or more unless otherwise specified.

Terms such as "about" or "approximately" as used herein includes a stated value and an average value within an acceptable range of deviation of a particular value. The acceptable range of deviation is determined by a person of ordinary skill in the art in view of the measurement in question and the error associated with the measurement of a particular quantity (i.e., the limitations of the measurement system).

Terms such as "parallel," "perpendicular" or "equal" as used herein includes a stated condition and a condition similar to the stated condition. A range of the similar condition is within an acceptable deviation range, and the acceptable deviation range is determined by a person of ordinary skill in the art in view of measurement in question and the error associated with the measurement of a particular quantity (i.e., the limitations of a measurement system). For example, the term "parallel" includes absolute parallel and approximately parallel, and the acceptable deviation range for the approximately parallel may be, for example, a deviation within 5 degrees. The term "perpendicular" includes absolute vertical and approximately vertical, and the acceptable deviation range of the approximate vertical may also be, for example, a deviation within 5 degrees. The term "equal" includes absolute equality and approximate equality, the acceptable deviation range of the approximate equality may be that, for example, a difference between the two that are equals is less than or equal to 5% of either of the two.

Figure 1:
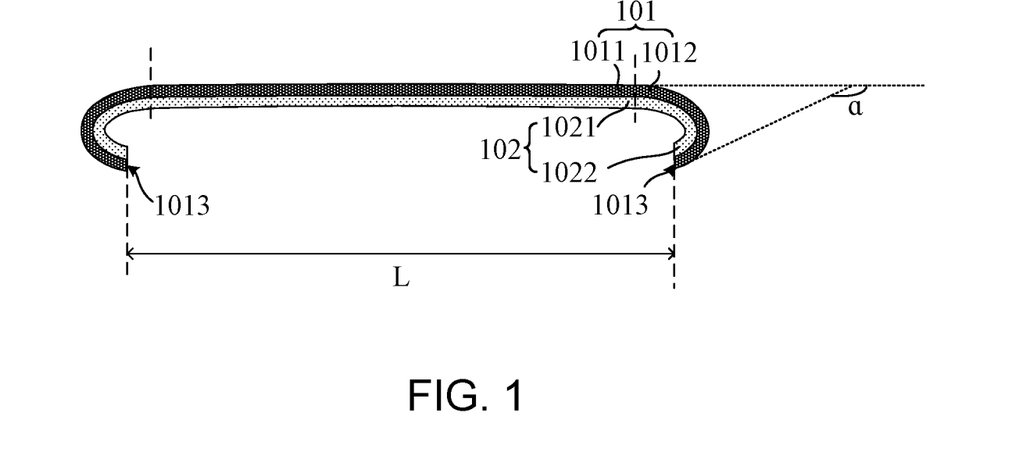
FIG. 1 is a structural diagram of a curved display screen, in accordance with some embodiments.

As shown in FIG. 1, a curved display screen 1000 includes a curved cover plate 101 and a flexible display panel 102. The curved cover plate 101 covers an outer surface, for displaying images, of the flexible display panel 102, so as to protect the flexible display panel 102 from external impacts. For a normal display of the flexible display panel 102, the curved cover plate 101 has a good light transmittance on a basis of a certain strength. For example, the curved cover plate 101 may be made of at least one of sapphire glass, gorilla glass, polyethylene terephthalate, polycarbonate, polyethersulfone, polyethylene naphthalate, or polynorbornene.

In terms of shape, the curved cover plate 101 of the curved display screen 1000 includes a planar cover plate portion 1011 and two bent cover plate portions 1012. The planar cover plate portion 1011 may be a rectangular plate extending in a direction parallel to a plane, which has two pairs of opposite sides. Each bent cover plate portion 1012 is connected to one side of the planar cover plate portion 1011, and sides to which the two bent cover plate portions 1012 are connected are opposite to each other. The bent cover plate portions 1012 and the planar cover plate portion 1011 are connected in a smooth transition manner. For example, the bent cover plate portions 1012 may be of a circular arc structure tangent to the planar cover plate portion 1011.

It will be noted that, the curved cover plate 101 is usually of an integrally formed structure. Strictly speaking, there is no boundary between the planar cover plate portion 1011 and the bent cover plate portions 1012. Generally, a region surrounded by an edge contour at the end of a plane and extending in the plane is defined as the planar cover plate portion 1011, and the bent cover plate portions 1012 bend and extend from edges of the planar cover plate portion 1011, thereby forming the bent curved cover plate 101.

The two bent cover plate portions 1012 are bent from the planar cover plate portion 1011 toward a same side. Ends, away from the planar cover plate portion 1011, of the bent cover plate portions 1012 are bent ends 1013 of the curved cover plate 101. Two bent ends 1013 of the curved cover plate 101 define an opening of the curved cover plate 101. A distance between the two bent ends 1013 of the curved cover plate 101 is a width L of the opening. A plane tangent to the bent ends 1013 of the curved cover plate 101 is defined as an end tangent plane of the curved cover plate 101. An included angle between the end tangent plane of the curved cover plate 101 and an outer side of the planar cover plate portion 1011 is defined as a bent angle α of the curved cover plate 101, as shown in FIG. 1. The bent angle α of the curved cover plate 101 may indicate a bent degree of the curved cover plate 101. The bent angle α of the curved cover plate 101 is greater than 0 degrees, and usually not greater than 180 degrees.

The greater the bent angle α of the curved cover plate 101 is, the greater the bent degree of the curved cover plate 101 is. In a case where the bent angle α of the curved cover plate 101 is greater than 90 degrees, one bent cover plate portion 1012 extends over an outer border and then bends and extends toward the other bent cover plate portion 1012. The bent cover plate portion 1012 has a certain bending depth. In a plane parallel to the planar cover plate portion 1011, the maximum distance between the bent end of the curved cover plate 101 and an inner surface of the bent cover plate portion 1012 is the bending depth.

A surface of the curved cover plate 101 facing towards a bending direction of the bent cover plate portion 1012 is the inner surface, a surface of the curved cover plate 101 facing away from the bending direction of the bent cover plate portion 1012 is the outer surface, and the inner surface of the curved cover plate 101 is an attaching surface attached to the flexible display panel 102. The flexible display panel 102 is attached to the attaching surface of the curved cover plate 101. The flexible display panel 102 may be a flexible OLED (organic light-emitting diode) display panel or other flexible and bendable screens.

A shape of which the flexible display panel 102 and the curved cover plate 101 are fully attached is defined as an attaching shape. The flexible display panel 102 in the attaching shape has a curved shape that matches the curved cover plate 101. The flexible display panel 102 in the attaching shape includes a planar display portion 1021 and two bent display portions 1022. The planar display portion 1021 is attached to an inner surface of the planar cover plate portion 1011, and is of a planar plate structure that matches the planar cover plate portion 1011. The bent display portions 1022 are attached to inner surfaces of the bent cover plate portions 1012, and are of a bent structure that matches the bent display portions 1012.

In a process of fabricating the curved display screen 1000, an attaching apparatus is required to attach the flexible display panel 102 to the attaching surface of the curved cover plate 101. A middle portion (i.e., planar display portion 1021) of the flexible display panel 102 is pressed and attached to the planar cover plate portion 1011 of the curved cover plate 101 through the attaching apparatus firstly, and then, side portions (i.e., bent display portions 1022) of the flexible display panel 102 are pressed and attached to the bent cover plate portions 1012 of the curved cover plate 101, so as to complete an attaching operation of the flexible display panel 102 and the curved cover plate 101.

Figure 2:
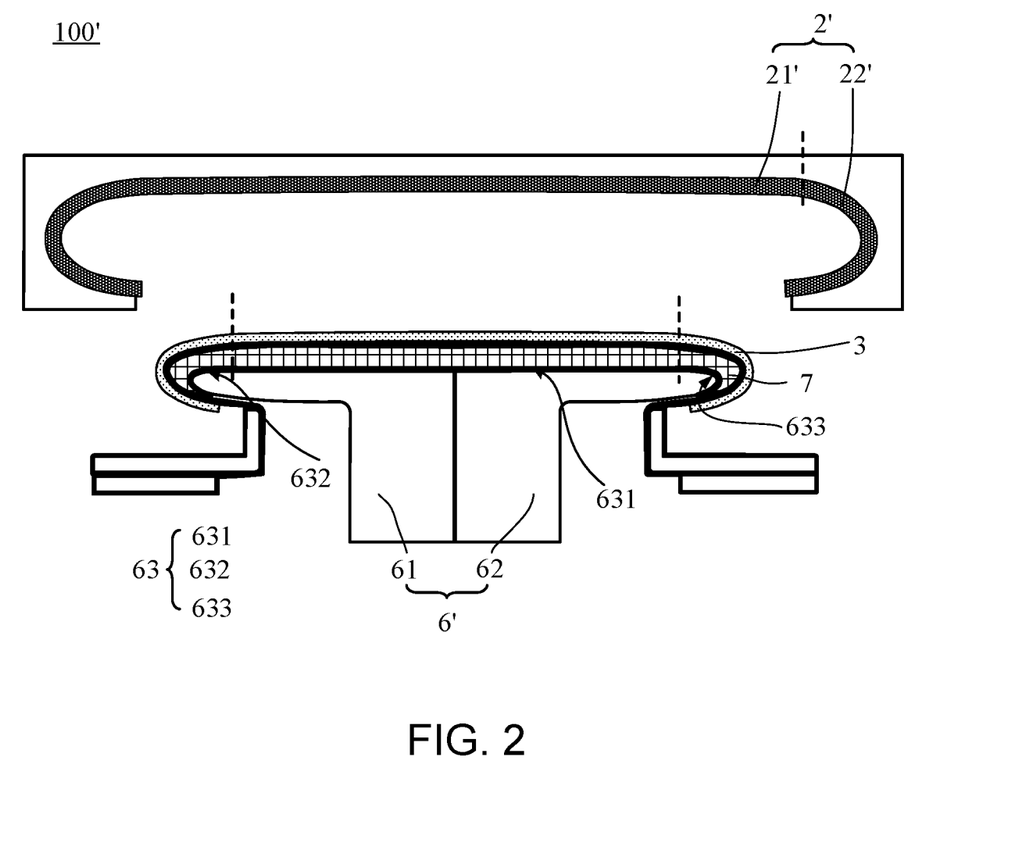
FIG. 2 is a structural diagram of an attaching apparatus of an example.

In an example, an attaching apparatus 100' is provided. The attaching apparatus 100' includes an attaching body 6' and an elastic support body 7. An outer side of the attaching body 6' has an attaching and pressing surface 63. The attaching and pressing surface 63 includes an attaching flat surface 631, and a first attaching bent surface 632 and a second attaching bent surface 633 that are located at both sides of the attaching flat surface 631. The attaching flat surface 631 corresponds to a planar cover plate portion 21' of a curved cover plate 2', and the first attaching bent surface 632 and the second attaching bent surface 633 correspond to two bent cover plate portions 22' of the curved cover plate 2'. The attaching body 6' includes a first attaching half body 61 and a second attaching half body 62. An outer side of the first attaching half body 61 has the first attaching bent surface 632, and an outer side of the second attaching half body 62 has the second attaching bent surface 633. The elastic support body 7 is attached to the attaching and pressing surface 63 of the attaching body 6', which is attached to the first attaching bent surface 632 and the second attaching bent surface 633. The first attaching half body 61 and the second attaching half body 62 are capable of being proximate to or far away from each other to achieve an attaching operation of a flexible panel 3 and the curved cover plate 2'.

In the attaching apparatus above mentioned, the elastic support body 7 is repeatedly stretched during a process that the first attaching half body 61 and the second attaching half body 62 move proximate to or far away from each other, which causes an usable time of the elastic support body 7 to be seriously shortened; moreover, in a case where a curved cover plate 2' with a large bent angle is attached to the flexible display panel 3, a relative movement distance of the first attaching half body 61 and the second attaching half body 62 is increased, thereby causing a stretched distance of the elastic support body 7 to increase, and further affecting the usable time of the elastic support body 7.

On this basis, in embodiments of the present disclosure, an attaching apparatus 100 is provided. The attaching apparatus 100 is used for attaching a flexible display panel to a curved cover plate, and may be used for attaching a curved cover plate with a large bent angle (within a range of 90 degrees to 180 degrees) to the flexible display panel. The following embodiments are described by taking an example in which the bent angle of the curved cover plate is within the range of 90 degrees to 180 degrees.

It will be noted that, the attaching apparatus 100 can not only be used for attaching the flexible display panel to the curved cover plate with the large bent angle between 90 degrees to 180 degrees, but also for attaching the flexible display panel to a curved cover plate with a small bent angle less than 90 degrees.

Figure 3:
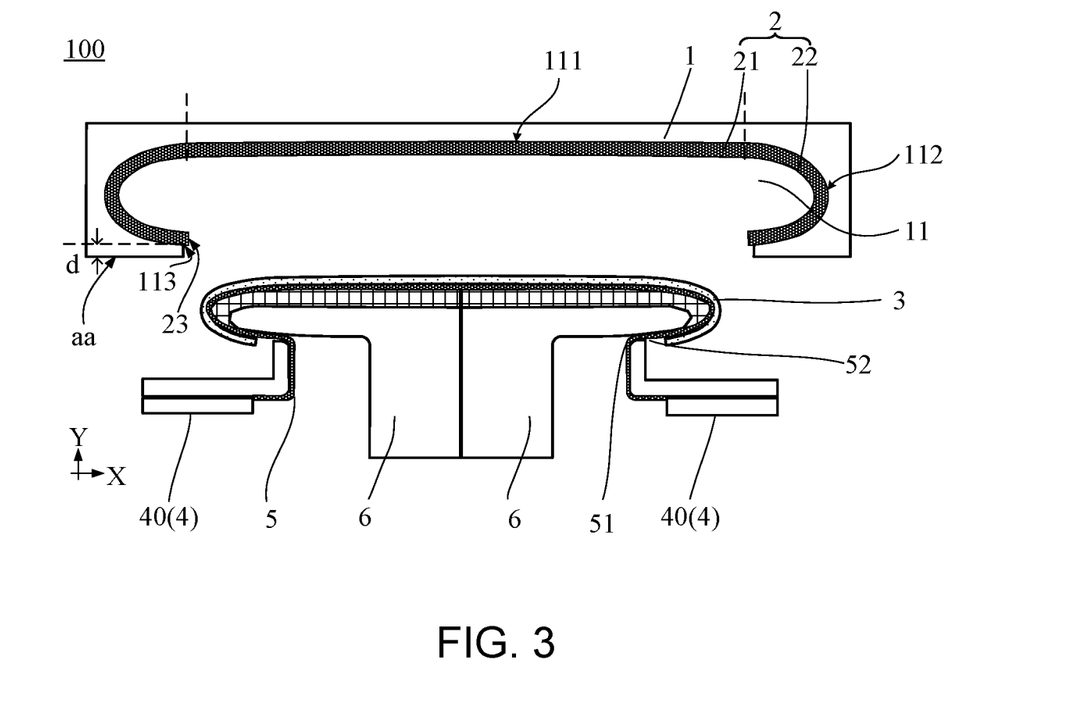
FIG. 3 is a structural diagram of an attaching apparatus, in accordance with some embodiments.
Figure 4:
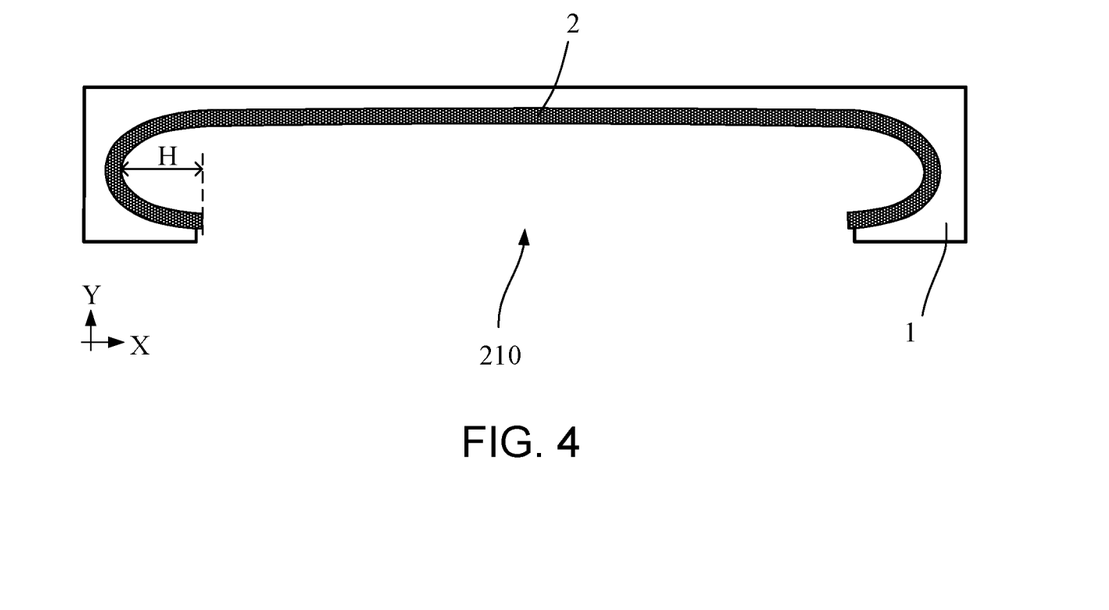
FIG. 4 is a diagram illustrating cooperation of a cover plate fixing part and a curved cover plate in FIG. 3.

As shown in FIG. 3, the attaching apparatus 100 includes a cover plate fixing part 1 and tow slideable press heads 6. FIG. 4 is a schematic diagram illustrating cooperation between the cover plate fixing part 1 and a curved cover plate 2 in FIG. 3.

The cover plate fixing part 1 is used for fixing the curved cover plate 2. The cover plate fixing part 1 may be adsorbed on an outer surface of the curved cover plate 2 through vacuum adsorption to achieve fixing of the curved cover plate 2. The cover plate fixing part 1 may also fix the curved cover plate 2 through other manners, which is not limited in the embodiments of the present disclosure. For example, the cover fixing part 1 may be a jig having a shape matching a shape of the curved cover plate 2, i.e., a cover plate jig. The following embodiments will be described by considering an example in which the cover plate fixing part 1 is a cover plate jig.

In some embodiments, as shown in FIGS. 3 and 4, the cover plate jig 1 is provided with a cover plate groove 11, and the cover plate groove 11 is communicated with the outside through a notch at a side. The cover plate groove 11 defines a groove space matching the curved cover plate 2. An inner wall of the groove space includes a planar groove wall 111 and bent groove walls 112. An outer surface of a planar cover plate portion 21 of the curved cover plate 2 is attached to the planar groove wall 111, and outer surfaces of two bent cover plate portions 22 are attached to the bent groove walls 112. A cover plate opening 210 of the curved cover plate 2 located in the cover plate groove 11 is communicated with the outside through the notch.

Bent ends 23 of the curved cover plate 2 should also be aligned with ends 113 of the bent groove walls 112 or exceed the ends 113 of the bent groove walls 112 by a certain distance, so that the cover plate groove 11 can restrict the curved cover plate 2 to the cover plate groove 11, and the cover plate opening 210 is located in the notch, so as to facilitate performing the attaching operation by using of the attaching apparatus 100.

In the following, for convenience of description, it is defined that due to restriction of the cover plate jig 1, the planar cover plate portion 21 of the curved cover plate 2 is parallel to a first plane. A direction in which the cover plate opening 210 faces is a first direction, a straight line in the first direction is a first straight line. That is, the first straight line is perpendicular to the first plane, and the first direction is a direction in which the cover plate opening 210 is opposite to the planar cover plate portion 21 in the first straight line. As shown in FIG. 3, there is a certain distance d between an outer surface aa of the cover plate jig 1 in the first direction and the end 113 of the bent groove wall 112.

Considering orientations shown in FIGS. 3 and 4 as an example, the first straight line is parallel to a Y-axis direction, the first direction is a downward direction in the Y-axis (i.e., −Y direction), and the first plane is parallel to an X-axis direction.

Figure 5:
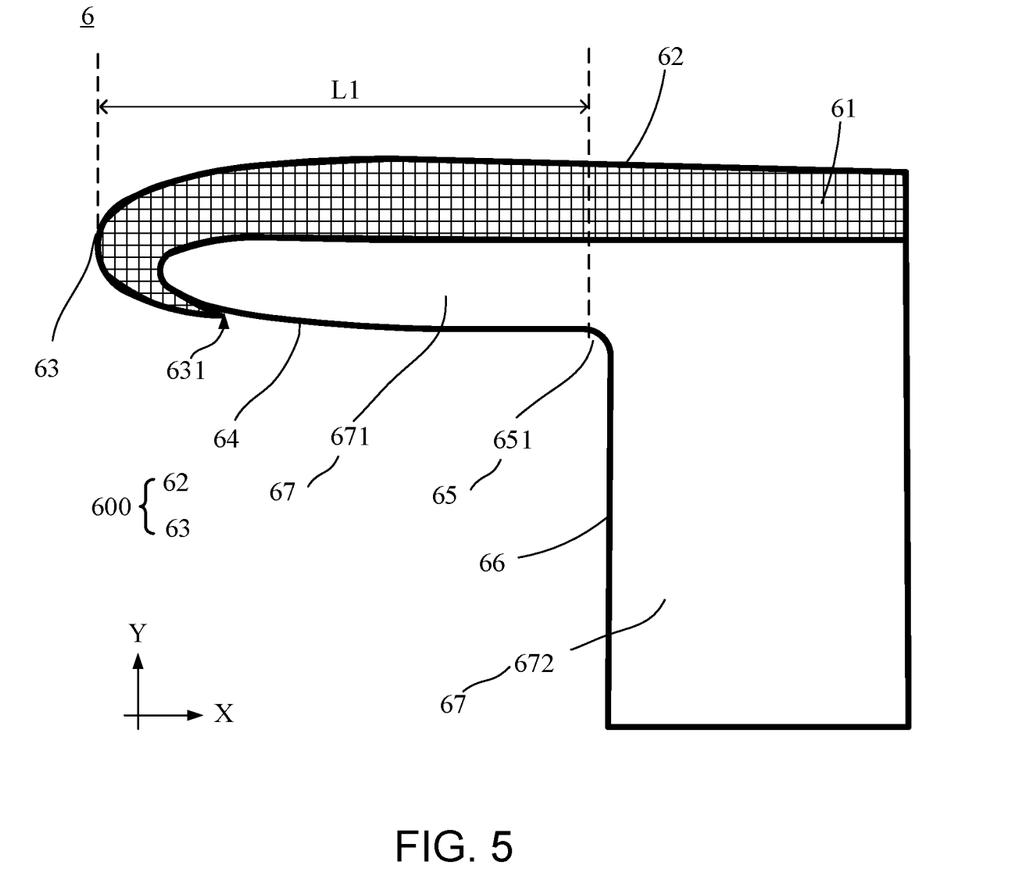
FIG. 5 is a structural diagram of the slideable press head in FIG. 3.

FIG. 5 is a structural diagram of one of the two slideable press heads 6 in FIG. 3. As shown in FIGS. 3 and 5, the two slideable press heads 6 are disposed at a side of the cover plate jig 1 in the first straight line. That is, the two slideable press heads 6 are arranged at a side, configured to fix the curved cover plate 2, of the cover plate jig 1.

The cover plate opening 210 of the curved cover plate 2 in the cover plate jig 1 faces a side at which the two slideable press heads 6 are located; that is, the two slideable press heads 6 are disposed at an outer side of the cover plate jig 1 in the first direction. Considering the orientation shown in FIG. 3 as an example, the two slideable press heads 6 are located under the cover plate jig 1.

The two slideable press heads 6 are used for supporting the flexible display panel 3 and driving the flexible display panel 3 to be attached to the curved cover plate 2. The two slideable press heads 6 are capable of moving proximate to or far away from each other in a second straight line perpendicular to the first straight line under driving of a drive unit. During a process that the two slideable press heads 6 are far away from each other, the flexible display panel 3 can be pressed and attached to the attaching surface of the curved cover plate 2. The second straight line is parallel to the X-axis direction.

It will be understood that the structure of the drive unit may be various, and the embodiments of the disclosure do not limit the structure of the drive unit for the slideable press heads.

For example, the drive unit includes a first drive member, a first motion mechanism, and the like. The first driving member can drive the slideable press heads 6 to move relative to each other, for example, to approach and move away from each other, by driving the first motion mechanism.

It will be noted that the first motion mechanism may be a multi-axis motion mechanism, for example, one or more of X-axis linear motion, X-axis rotational motion, Y-axis linear motion, Y-axis rotational motion, Z-axis linear motion, or Z-axis rotational motion may be implemented. The first drive member connected to the first motion mechanism may be one or more servo motors or other structures with power output and convenient control. It can be understood that, the attaching apparatus 100 provided by some embodiments of the present disclosure may further include a control unit, which may implement control on the first drive member based on a preset control program, so as to implement control on relative movement of the two slideable press heads 6, for example, movement for the attaching track of the curved cover plate.

In some examples, the control unit is a microprocessor programmed to perform one or more operations and/or functions described herein. In some other examples, control component is executed in whole or in part by specially configured hardware (e.g., by one or more application specific integrated circuits (ASIC)).

The two slideable press heads 6 each have a first position for attaching a planar region and a second position for attaching a curved region in a motion path of moving proximate to and away from each other.

During a process of attaching the flexible display panel 3 to the curved cover plate 2, the two slideable press heads 6 move to the first position (as shown in FIG. 3) where they draw close to each other firstly, and the cover plate jig 1 moves toward the slideable press heads 6 in the first direction under driving of the drive unit. When the cover plate jig 1 moves to a position where the flexible display panel 3 on the two slideable press heads 6 is attached to the planar cover plate portion 21 of the curved cover plate 2, the cover plate jig 1 stops. The two slideable press heads 6 at the first position drive the flexible display panel 3 to be pressed and attached to the planar cover plate portion 21 of the curved cover plate 2, which achieve the attaching operation of a planar region. In this case, a position where the cover plate jig 1 and the slideable press heads 6 are located is defined as an attaching position.

Then, the two slideable press heads 6 move away from each other to the second position in the second straight line (i.e., the X-axis direction), and the two slideable press heads 6 at the second position drive the flexible display panel 3 to be pressed and attached to the two bent cover plate portions 22 of the curved cover plate 2, so as to achieve the attaching operation of a curved region, and complete attaching of the flexible display panel 3 and the curved cover plate 2.

It will be noted that, the two slideable press heads 6 at the first position are directly opposite to the cover plate opening 210 of the curved cover plate 2 in the cover plate jig 1, and a maximum distance between an outer edges, far away from each other, of the two slideable press heads 6 at the first position in the second straight line is less than a width of the cover plate opening 210 of the curved cover plate 2, so as to allow the slideable press heads 6 to move to a concave side of the curved cover plate 2 through the cover plate opening 210. For example, the two slideable press heads 6 at the first position are in contact with each other.

In some embodiments, the slideable press heads 6 also have a function of performing moulding of the flexible display panel 3. Surfaces of the slideable press heads 6 for supporting the flexible display panel 3 are moulding surfaces 600. By attaching the flexible display panel 3 to the moulding surfaces 600 of the slideable press heads 6, the flexible display panel 3 may be bent into a shape to be formed.

In some embodiments, the two slideable press heads 6 are of a symmetrical structure with respect to the first straight line. In some other embodiments, the two slideable press heads 6 may not be of structures that are symmetrical, which is not limited in the embodiments of the present disclosure. FIGS. 3 and 5 are illustrated by considering an example in which the two slideable press heads 6 are of a symmetrical structure with respect to the first straight line.

As shown in FIG. 5, considering one of the two slideable press heads 6 as an example, the slideable press head 6 includes a planar moulding surface 62, a bent moulding surface 63, and a bottom extension surface 64. The planar moulding surface 62 and the bent moulding surface 63 form the moulding surface 600.

It can be understood that, the planar moulding surfaces 62 and the bent moulding surfaces 63 in the two slideable press heads 6 constitute the moulding surface 600 for moulding the flexible display panel 3. That is, The planar moulding surface 62 and the bent moulding surface 63 of each slideable press head 6 are part of the moulding surface 600 for moulding the flexible display panel 3.

The planar moulding surface 62 is located at a side of the slideable press head 6 proximate to the cover plate jig 1, and the planar moulding surface 62 is parallel to the first plane. The planar moulding surface 62 is used to perform moulding of the planar display portion of the flexible display panel 3, and drive the flexible display panel 3 to be attached to the planar cover plate portion 21.

The bent moulding surface 63 is connected to an end of the planar moulding surface 62 away from the other slideable press head 6 in the second straight line. The bent moulding surface 63 bends from the end of the planar moulding surface 62 away from the other slideable press head 6 toward a side facing away from the cover plate jig 1, so as to perform moulding of the bent display portion of the flexible display panel 3 and drive the flexible display panel 3 to be attached to the bent cover plate portion.

The bottom extension surface 64 is connected to an end of the bent moulding surface 63 away from the planar moulding surface 62; that is, two ends of the bent moulding surface 63 are connected with the planar moulding surface 62 and the bottom extension surface 64. The end 631 of the bent moulding surface 63 away from the planar moulding surface 62 is a moulding end of the moulding surface 600, where the moulding end refers to a position corresponding to an end of the bent display portion in the flexible display panel 3 that is attached to the slideable press head 6. The bottom extension surface 64 continues to extend for a certain distance from the moulding end toward a side away from the bent moulding surface 63. The maximum distance L1 between an end of the bottom extension surface 64 away from the bent moulding surface 63 in the second straight line and an outer edge of the bent moulding surface 63 is greater than the bending depth H (as shown in FIG. 4) of the curved cover plate 2 in the cover plate jig 1.

In some embodiments, as shown in FIG. 5, the slideable press head 6 includes a press head portion 67, and an elastic cushion 61 is fixedly attached on the press head portion 67. The elastic cushion 61 is used to support the flexible display panel 3. The press head portion 67 includes a horizontal extension sub-portion 671 and a vertical extension sub-portion 672 connected to an end of the horizontal extension sub-portion 671, so as to approximately form an upside-down L-shaped structure. The horizontal extension sub-portion 671 is closer to the cover plate jig 1 than the vertical extension sub-portion 672, and the elastic cushion 61 is fixedly attached to the horizontal extension sub-portion 671. Ends, connected to corresponding vertical extension sub-portions 672, of horizontal extension sub-portions 671 of press head portions 67 of the two slidable press heads 6 are proximate to each other.

An outer surface of the elastic cushion 61 away from the press head portion 67 forms the planar moulding surface 62 and the bent moulding surface 63 that match the flexible display panel 3.

In some examples, the bottom extension surface 64 of the slideable press head 6 is formed by the outer surface of the elastic cushion 61. In some other examples, the bottom extension surface 64 of the slideable press head 6 is formed by a surface of the press head portion 67. In yet some other examples, the bottom extension surface 64 of the slideable press head 6 is formed by the outer surface of the elastic cushion 61 and the surface of the press head portion 67. The embodiments of the present disclosure do not limited thereto. For example, as shown in FIG. 5, the bottom extension surface 64 is formed by part of the surface of the press head portion 67.

The elastic cushion 61 may be deformed when it is subjected to a stress, which may buffer an impact of the slideable press head 6 on the flexible display panel 3, and may compensate for a poor contact between the flexible display panel 3 on the slideable press head 6 and the curved cover plate 2 caused by machining tolerances during attaching, thereby ensuring an attaching quality of the flexible display panel 3 and the curved cover plate 2.

The above-mentioned "poor contact" means: due to the machining tolerance of the slideable press head 6, when the flexible display panel 3 is attached to the curved cover plate 2, a partial region of the flexible display panel 3 cannot be completely attached to the curved cover plate 2.

The elastic cushion 61 is usually made of an elastic material with characteristics of uniform texture, good absorptivity and burning resistance during friction and the like, such as silica gel and rubber.

In some embodiments, the elastic cushion 61 is made of silica gel, and the silica gel is provided at an outer surface of the press head portion 67 through injection molding.

It will be noted that, in a case where the bottom extension surface 64 of the slideable press head 6 is formed by the outer surface of the elastic cushion 61, the above-mentioned "the elastic pad 61 is provided at an outer surface of the press head portion 67" means that, the elastic cushion 61 is provided on the planar moulding surface 62, the bent moulding surface 63, and the bottom extension surface 64 of the press head portion 67. That is, an outer surface of the elastic cushion 61 facing away from the press head portion 67 forms the planar moulding surface 62, the bent moulding surface 63, and the bottom extension surface 64 for cooperation with the flexible display panel 3.

Similarly, in a case where the bottom extension surface 64 of the slideable press head 6 is formed by the surface of the press head portion 67, the above-mentioned "the elastic pad 61 is provided at an outer surface of the press head portion 67" means that, the elastic cushion 61 is provided on the planar moulding surface 62 and the bent moulding surface 63 of the press head portion 67. That is, an outer surface of the elastic cushion 61 facing away from the press head portion 67 forms the planar moulding surface 62 and the bent moulding surface 63 for cooperation with the flexible display panel 3.

Similarly, in a case where the bottom extension surface 64 of the slideable press head 6 is formed by the outer surface of the elastic cushion 61 and the surface of the press head portion 67, the above-mentioned "the elastic pad 61 is provided at an outer surface of the press head portion 67" means that, the elastic cushion 61 is provided on the planar moulding surface 62, the bent moulding surface 63, and part of the bottom extension surface 64 of the press head portion 67. That is, an outer surface of the elastic cushion 61 facing away from the press head portion 67 forms the planar moulding surface 62, the bent moulding surface 63, and the part of the bottom extension surface 64 for cooperation with the flexible display panel 3.

The injection molding process includes: fabricating a contour mold for the slideable press head 6 (including the press head portion 67 and the elastic cushion 61 to be formed); processing the surface of the press head portion 67 to make a surface of the press head portion 67 in contact with the elastic cushion 61 to be formed be a rough surface, the rough surface being capable of increasing a friction between the press head portion 67 and the elastic cushion 61 to be formed, thereby facilitating fixing of the elastic cushion 61 to be formed; putting the press head portion 67 into the contour mold, and in this case, a molding space for the elastic cushion 61 to be formed being formed between the press head portion 67 and the contour mold; filling the silica gel into the molding space between the contour mold and the press head portion 67; and placing the contour mold filled with the silica gel and the press head portion 67 in a high temperature environment until rubber is molded, so that the elastic cushion 61 is formed.

For example, the rough surface may have protrusions, ravines, dull polish, or the like thereon, which is not limited in the various embodiments of the present disclosure. In some examples, the roughness of the surface of the press head portion 67 in contact with the elastic cushion 61 is greater than roughness of other surfaces of the press head portion 67. In some other examples, the roughness of the surface of the press head portion 67 in contact with the elastic cushion 61 is greater than roughness of a surface of the elastic cushion 61 in contact with the flexible display panel 3.

The elastic cushion 61 and the press head portion 67 are connected through injection molding, so that the fixed connection between the elastic cushion 61 and the press head portion 67 is firm, a molding accuracy of the elastic cushion 61 is high, and accordingly an accuracy of the moulding surface is high. In some examples, the elastic cushion 61 may also be fixedly connected with the press head portion 67 by using adhesive glue.

In the attaching apparatus 100 provided by some embodiments of the present disclosure, each of the two slideable press heads 6 is provided with an independent elastic cushion 61; that is, two elastic cushions 61 are separated from each other. Such design may avoid a problem of shortening the usage time of an integrated elastic cushion 61 due to repeated tension, and may also overcome a problem of insufficient tensile amount, so as to facilitate attaching of the large bent angle curved cover plate 2 with a large bending depth and the flexible display panel 3. The two elastic cushions 61 adopting separate design may also be used repeatedly, which reduces the cost of the attaching apparatus 100 and improves reliability.

In some embodiments, as shown in FIG. 5, the slideable press head 6 further includes a slider connection surface 66. The slider connection surface 66 is disposed at an end of the bottom extension surface 64 away from the bent moulding surface 63. The slider connection surface 66 extends from an end of the bottom extension surface 64 in the first direction facing away from the planar moulding surface 62, and is connected to the bottom extension surface 64 through a curved surface rounded corner 65. For example, a cross section, in a section parallel to an axial direction of the slideable press head 6 itself, of the curved surface 65 is a rounded corner 651.

In some embodiments, as shown in FIG. 3, the attaching apparatus 100 further includes a carrier film 5. The carrier film 5 has a first main surface 51 and a second main surface 52 opposite to each other. The first main surface 51 is used for being in contact with the moulding surface 600, and the second main surface 52 is used for fixing the flexible display panel 3.

The attaching apparatus 100 implements moulding of the flexible display panel 3 and the slideable press heads 6 through a guide film technology. Since the flexible display panel 3 is pasted on the second main surface 52 of the carrier film 5, the carrier film 5 may drive the flexible display panel 3 to move and bend. When the first main surface 51 of the carrier film 5 contacts the moulding surface 600 along with the movement of the carrier film 5, the flexible display panel 3 may achieve moulding using of the moulding surface 60.

In some examples, the carrier film 5 may be a sticky film. In some other examples, the carrier film 5 is a film with no stickiness (i.e., ordinary film). For the ordinary film, the flexible display panel 3 may be pasted on the second main surface 52 of the carrier film 5 away from the slideable press heads 6 through adhesives such as double-sided tape. For example, the carrier film 5 may be a polyethylene terephthalate (PET) film, which has a characteristic of being stretchable. The flexible display panel 3 may be pasted on the PET film by using the double-sided tape. After attaching of the flexible display panel 3 and the curved cover plate 2, the PET film and the flexible display panel 3 may be separated easily. Therefore, an attaching effect of the flexible display panel 3 and the curved cover plate 2 will not be damaged, and the flexible display panel 3 will not be damaged too.

In some embodiments, as shown in FIG. 3, the attaching apparatus 100 further includes a guide mechanism 4 for guiding the movement of the carrier film 5 to achieve moulding of the flexible display panel 3. The guide mechanism 4 can move along a preset motion path under driving of the driving unit, so as to realize moulding steps of the flexible display panel.

For example, the drive unit further includes a second drive member, a second motion mechanism, and the like. The second driving member can drive the guide mechanism 4 to move by driving the second moving mechanism.

It will be noted that the second motion mechanism may be a multi-axis motion mechanism, for example, one or more of X-axis linear motion, X-axis rotational motion, Y-axis linear motion, Y-axis rotational motion, Z-axis linear motion, or Z-axis rotational motion may be implemented. The second drive member connected to the second motion mechanism may be one or more servo motors or other structures with power output and convenient control. It can be understood that, the attaching device provided by some embodiments of the present disclosure may further include a control unit, which may implement control on the second drive member based on a preset control program, so as to implement controlling the movement of the guide mechanism 4, and implementing the moulding steps of the flexible display panel.

The guide mechanism 4 has a moulding position in a motion path thereof. When the guide mechanism 4 drives the flexible display panel 3 and the moulding surface 600 of the slideable press heads 6 to complete the attaching and moulding operation through the carrier film 5, a position where the guide mechanism 4 is located is the moulding position.

In some embodiments, as shown in FIG. 3, the guide mechanism 4 includes two guide clamps 40, the two guide clamps 40 and the two slideable press heads 6 are correspondingly arranged, and the two guide clamps 40 are used to fix and guide ends of the carrier film 5.

In a process that the guide mechanism 4 guides the movement of the carrier film 5 to achieve moulding of the flexible display panel 3, first, the two guide clamps 40 are located outside the two slideable press heads 6 in the second straight line. The two guide clamps 40 fix and tension two ends of the carrier film 5, so that the carrier film 5 is at a plane parallel to the planar moulding surface 62. The flexible display panel 3 is located on the second main surface 52 of the carrier film 5 away from the slideable press heads 6. The carrier film 5 is kept in a tensioned state, which may ensure the attaching quality of the curved cover plate 2 and the flexible display panel 3.

Subsequently, the two guide clamps 40 move toward the slideable press heads 6 in the first straight line. After the guide clamps 40 move to the outside of the slideable press heads 6 and below the planar moulding surface 62, the slideable press heads 6 lift up the carrier film 5, so that the first main surface 51 of the carrier film 5 facing away from the flexible display panel 3 is attached to the planar moulding surface 62 and part of the bent moulding surfaces 63 of the slideable press heads 6. The two guide clamps 40 continue to approach each other, and after moving to the moulding position, the two guide clamps 40 stop.

Here, the "moulding position" refers to a position where the guide mechanism 4 is located when the guide mechanism 4 drives the flexible display panel 3 and the moulding surface 600 of the slideable press heads 6 to complete the attaching and moulding operation through the carrier film 5.

In order to achieve moulding of the flexible display panel 3, and to avoid the effect on the attaching quality due to premature contact between ends of the flexible display panel 3 and the curved cover plate 2 during a process that the slideable press heads 6 move from the first position to the second position, the guide mechanism 4 guides the carrier film 5 to make the flexible display panel 3 complete moulding at least when the slideable press heads 6 move to the second position. That is, when the slideable press heads 6 start moving from the first position and before moving to the second position, the guide mechanism 4 drives the flexible display panel 3 and the slideable press heads 6 to perform attaching and moulding.

Figure 6:
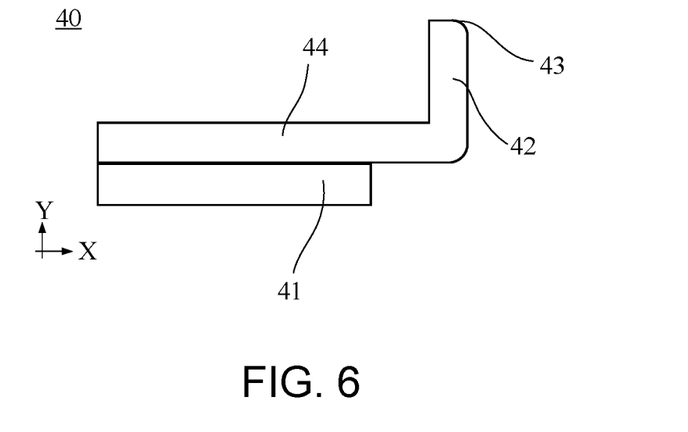
FIG. 6 is a structural diagram of a guide clamp in FIG. 3.

In some embodiments, as shown in FIGS. 3 and 6, each guide clamp 40 includes a guide member 42, a connection member 44 and a fixing member 41.

The guide member 42 extends in the first direction that is perpendicular to a movement direction of the slideable press heads 6. An end of the guide member 42 proximate to the moulding surface is a contact end 43 in contact with the carrier film 5.

The connection member 44 is connected to the other end of the guide member 42 away from the contact end 43, and extends from the guide member 42 in a movement direction of a corresponding slideable press head 6 away from the other slideable press head 6. That is, the guide member 42 and the connection member 44 constitute an L-shaped structure.

The fixing member 41 is parallel to and disposed under the connection member 44. That is, the connection member 44 is disposed above the fixing member 41 and extends in a direction parallel to the fixing member 41. In some examples, one end of the connection member 44 in an extending direction thereof is flush with the fixing member 41, and the other end extends beyond the fixing member 41.

The guide member 42 is disposed at the end, extending beyond the fixing member 41, of the connection member 44. The guide member 42 extends from the connection member 44 in a direction perpendicular to the connection member 44 and facing away from the fixing member 41.

The guide clamps 40 at the moulding position are located under the bottom extension surfaces 64 of the slideable press heads 6. The fixing member 41 and the connection member 44 are outside the cover plate jig 1 and the curved cover plate 2 at the attaching position. The guide member 42 is in a gap between the slideable press heads 6 and the whole of the cover plate jig 1 and the curved cover plate 2.

A motion path where the guide clamp 40 at the moulding position guides the carrier film 5 is that: the carrier film 5 protrudes from the moulding end of the bent moulding surface 63 and extends to the contact end 43; the carrier film 5 passes over the contact end 43 and extends to a side of the guide member 42 proximate to the other guide clamp 40, and extends along the guide member 42 to the connection member 44, and extends between the connection member 44 and the fixing member 41 in a curved path. The connection member 44 and the fixing member 41 clamp an end of the carrier film 5, so as to clamp and fix the carrier film 5.

For example, the guide member 42 and the connection member 44 are each plate-shaped, and the two are connected in an L-shape. The fixing member 41 is a fixing plate, and when the fixing member 41 moves towards the direction proximate to the connection member 44, the fixing member 41 can clamp and fix the carrier film 5.

Herein, the guide member 42 and the connection member 44 may be driven by different motion mechanisms of the driving unit, and the detailed implementation manner may be referred to the foregoing, and will not be described herein again.

A position where the contact end 43 is in contact with the carrier film 5 when the guide mechanism 4 moves to the moulding position is defined as a guide position. In order to make the guide mechanism 4 at the moulding position drive the flexible display panel 3 and the slideable press heads 6 moving between the first position and the second position to complete the attaching and moulding operation, the guide position is located at an end tangent plane of the slideable press head 6 tangent to the moulding end, or between the end tangent plane and the planar moulding surface 62.

Since the bottom extension surface 64 is at the end tangent plane or is closer to the planar moulding surface 62 than the end tangent plane, the contact end 43 presses the carrier film 5 on the bottom extension surface 64 of the slideable press head 6 located at the second position.

Figure 7:
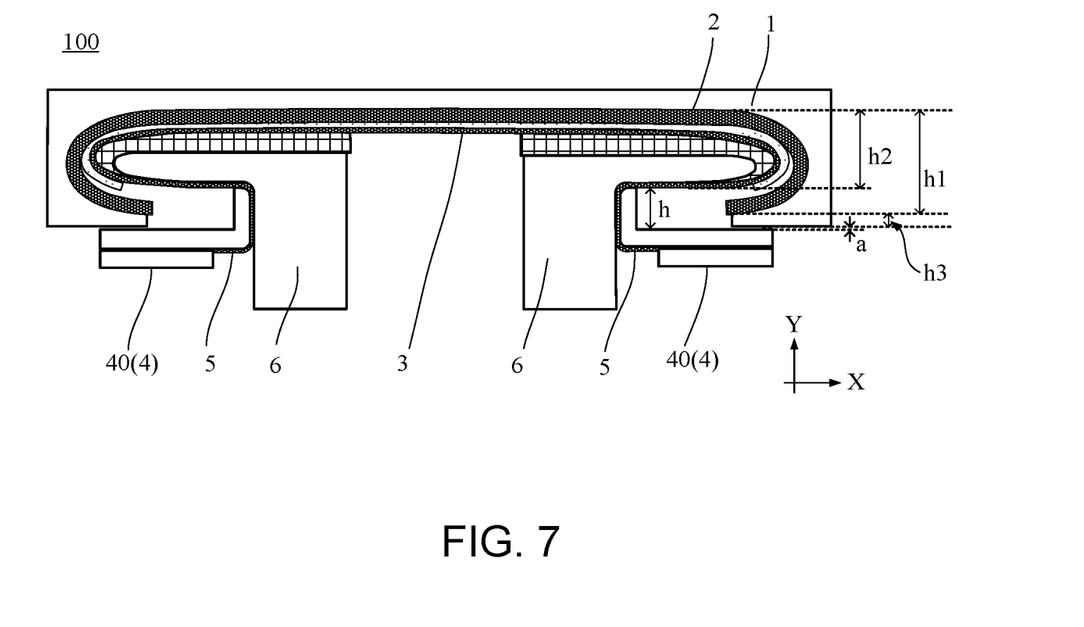
FIG. 7 is a structural diagram of an attaching apparatus, in accordance with some embodiments.

In some embodiments, as shown in FIGS. 6 and 7, the guide member 42 has a height h. A height h1 of the groove space limited by the cover plate groove 11 and matched with the curved cover plate 2 is 6 mm to 10 mm, such as 6 mm, 7 mm, 8 mm, 9 mm, or 10 mm. When the curved cover plate 2 and the flexible display panel 3 are attached to each other in a planar region, a distance h2 from the surface of the curved cover plate 2 away from the flexible display panel 3 to the contact end 43 of the guide member 42 contacting the carrier film 5 is 5 mm to 7 mm, such as 5 mm, 6 mm, or 7 mm. A distance h3 from the end 113 of the bent groove wall 112 to the lowest end of the cover plate jig 1 is 1 mm to 3 mm, such as 1 mm, 2 mm, or 3 mm. A distance a from the lowest end of the cover plate jig 1 to the surface of the connection member 44 proximate to the cover plate jig 1 is 0.5 mm to 2 mm, such as 0.5 mm, 1 mm, 1.5 mm, or 2 mm. The above parameters satisfy the following formulas:

$$h=h1+h3+a-h2, \text{ e.g., } 2.5 \text{ mm} \le h \le 8 \text{ mm}.$$

In some embodiments, when the guide mechanism 4 moves to the moulding position, the contact end 43 presses the carrier film 5 at a connection between the bottom extension surface 64 and the slider connection surface 66. That is, the guide position is located at a position where the bottom extension surface 64 is connected with the slider connection surface 66 when the slideable press heads 6 move to the second position.

In some embodiments, the slider connection surface 66 and the bottom extension surface 64 may be connected through the rounded corner 651. In this case, the contact end 43 is a circular arc protrusion matching the rounded corner 651.

In some embodiments, a diameter of the circular arc of the contact end 43 is equal to a difference between a diameter of the rounded corner 651 and a thickness of the carrier film 5.

The guide mechanism 4 in some embodiments of the present disclosure is designed in such way to ensure that attaching and moulding of the flexible display panel 3 and the moulding surface can be finished when the slideable press heads 6 move to the second position at the latest, so as to avoid interference due to the premature contact of the flexible display panel 3 and the curved cover plate 2, and ensure the attaching quality of the flexible display panel 3 and the curved cover plate 2.

FIG. 3 and FIGS. 8 to 10 are schematic diagrams of an attaching apparatus 100 provided by some embodiments of the present disclosure in an operation process. The operation process of the attaching apparatus is as follows.

As shown in FIG. 3, the guide clamps 40 in the guide mechanism 4 move to the moulding position, and drive the carrier film 5 to complete moulding on the slideable press heads 6.

Figure 8:
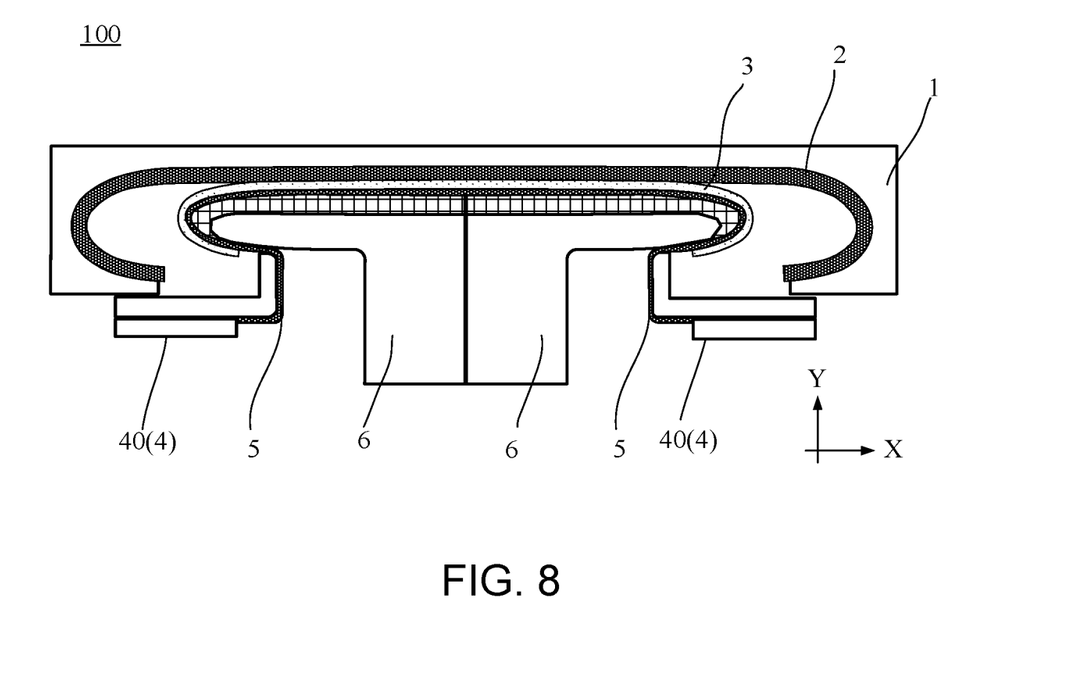
FIGS. 8 to 10 are diagrams illustrating different states of an attaching apparatus in a process of attaching a flexible display panel to a curved cover plate, in accordance with some embodiments.

As shown in FIG. 8, the cover plate jig 1 drives the curved cover plate 2 to move to the attaching position in the first direction. Details are that: the two slideable press heads 6 at the first position enter an inside of the curved cover plate 2 through the cover plate opening 210, and the planar moulding surfaces 62 of the pressure heads 6 drive the flexible display panel 3 to be pressed and attached to the planar cover plate portion of the curved cover plate 2.

For example, the drive unit further includes a third drive member, a third motion mechanism, and the like. The third driving member can drive the cover plate jig 1 to move.

It will be noted that the third motion mechanism may be a multi-axis motion mechanism, for example, one or more of X-axis linear motion, X-axis rotational motion, Y-axis linear motion, Y-axis rotational motion, Z-axis linear motion, or Z-axis rotational motion may be implemented. The third drive member connected to the third motion mechanism may be one or more servo motors or other structures with power output and convenient control. It can be understood that, the attaching device provided by some embodiments of the present disclosure may further include a control unit, which may implement control on the third drive member based on a preset control program, so as to implement controlling the movement of the cover plate jig 1.

Figure 9:
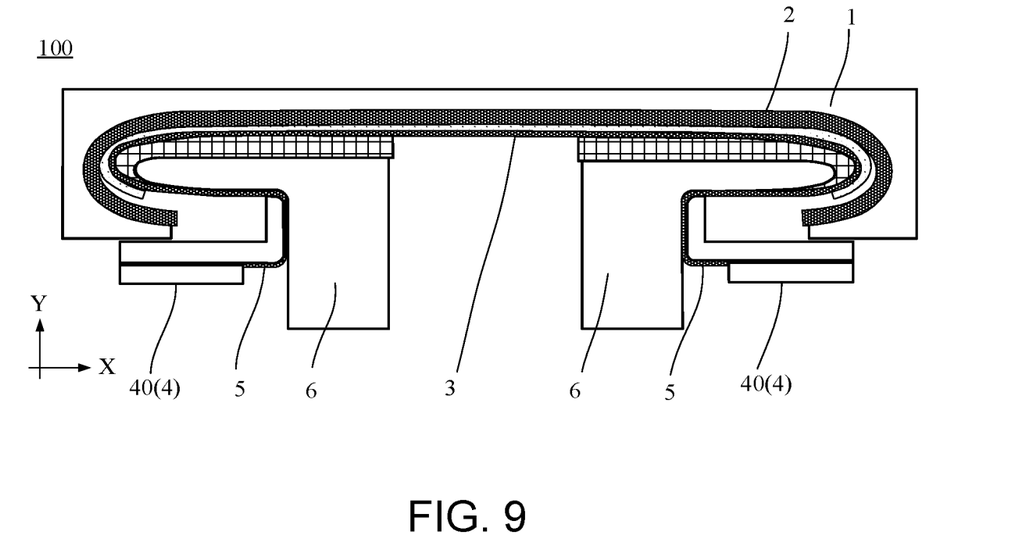

As shown in FIG. 9, the two slideable press heads 6 move away from each other to the second position in the second straight line, so that the bent moulding surfaces 63 of the slideable press heads 6 drive the flexible display panel 3 and upper portions of the bent cover plate portions of the curved cover plate 2 to complete attaching.

Figure 10:
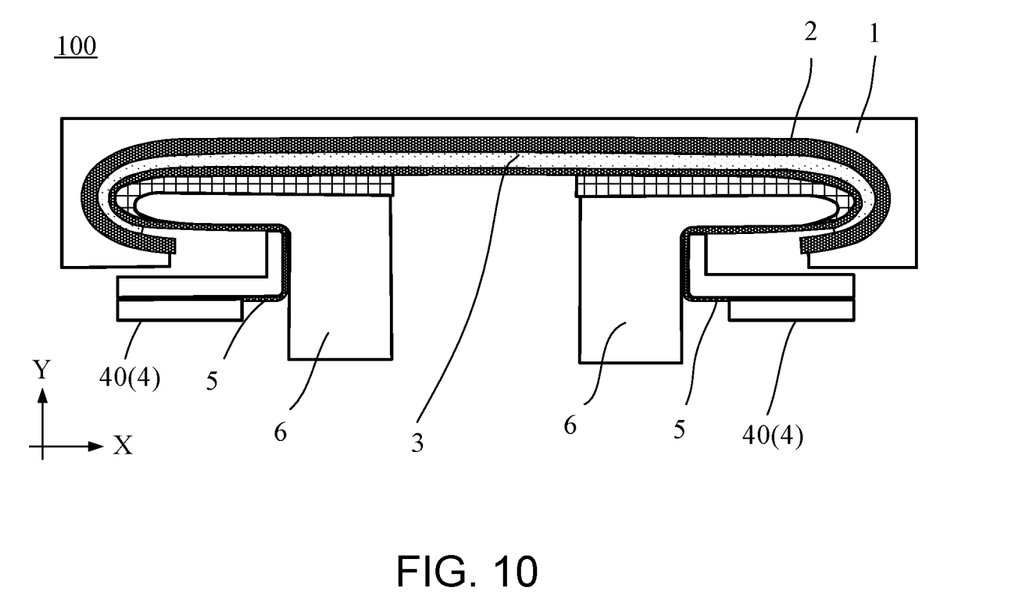

As shown in FIG. 10, the cover plate jig 1 is lifted up slightly, and the two slideable press heads 6 move for a small distance along the opposite directions, so that part of edges of the flexible display panel 3 and lower portions of the bent cover plate portions of the curved cover plate 2 complete attaching.

In some of the above embodiments, descriptions are made by considering an example in which positions of the two slideable press heads 6 in the first straight line direction are fixed, and the guide mechanism 4 and the cover plate jig 1 move relative to the two slideable press heads 6. However, the embodiments of the present disclosure are not limited to this. Based on the inventive concepts of the above embodiments, the slideable press heads 6 may be designed to be able to move in the first straight line.

The foregoing descriptions are merely specific implementation manners of the present disclosure, but the protection scope of the present disclosure is not limited thereto. Any person skilled in the art could conceive of changes or replacements within the technical scope of the present disclosure, which shall be included in the protection scope of the present disclosure. Therefore, the protection scope of the present disclosure shall be subject to the protection scope of the claims.

What is claimed is:

1. An attaching apparatus, comprising:
a cover plate fixing part configured to fix a curved cover plate; and
two slideable press heads arranged at a side, configured to fix the curved cover plate, of the cover plate fixing part, each slideable press head including an elastic cushion configured to support a flexible display panel; the two slideable press heads being configured to be capable of moving proximate to or far away from each other, and driving the flexible display panel to be pressed and attached to an attaching surface of the curved cover plate in a process that the two slideable press heads move far away from each other.

2. The attaching apparatus according to claim 1, wherein each slideable press head further includes a press head portion, and the elastic cushion is fixedly attached to the press head portion.

3. The attaching apparatus according to claim 2, wherein the press head portion includes: a horizontal extension sub-portion and a vertical extension sub-portion connected to an end of the horizontal extension sub-portion; the horizontal extension sub-portion is closer to the cover plate fixing part than the vertical extension sub-portion, and the elastic cushion is fixedly attached to the horizontal extension sub-portion; and
ends, connected to corresponding vertical extension sub-portions, of horizontal extension sub-portions of press head portions of the two slidable press heads are proximate to each other.

4. The attaching apparatus according to claim 2, wherein a surface, in contact with the elastic cushion, of the press head portion is a rough surface.

5. The attaching apparatus according to claim 2, wherein the elastic cushion is silica gel formed through injection molding on the press head portion.

6. The attaching apparatus according to claim 1, wherein the elastic cushion is made of silica gel or rubber.

7. The attaching apparatus according to claim 1, further comprising a guide mechanism configured to guide a movement of a carrier film for fixing the flexible display panel, wherein
each slideable press head has a moulding surface; and
the guide mechanism has a moulding position in a motion path thereof, and the guide mechanism at the moulding position is capable of bringing a first main surface of the carrier film into contact with the moulding surface.

8. The attaching apparatus according to claim 7, further comprising the carrier film, wherein
a second main surface, opposite to the first main surface, of the carrier film is configured to fix the flexible display panel.

9. The attaching apparatus according to claim 8, wherein each slideable press head further has a first position for attaching a planar region and a second position for attaching a curved region in a motion path thereof; and
the guide mechanism is capable of driving the flexible display panel and each slideable press head to complete an attaching and moulding operation by using of the carrier film when each slideable press head moving from the first position to the second position and the first main surface is in contact with the moulding surface.

10. The attaching apparatus according to claim 9, wherein
the moulding surface includes a planar moulding surface and a bent moulding surface, an end of the bent moulding surface is connected to the planar moulding surface, and another end of the bent moulding surface is a moulding end; and
the guide mechanism includes a contact end in contact with a portion, protruding from the bent moulding surface, of the carrier film;
when the guide mechanism moves to the moulding position, a position where the contact end is in contact with the carrier film is a guide position, and the guide position is located at an end tangent plane where each slideable press head is tangent to the moulding end, or located between an end tangent plane where each slideable press head is tangent to the moulding end and the planar moulding surface.

11. The attaching apparatus according to claim 10, wherein each slideable press head further has a bottom extension surface, wherein
the bottom extension surface extends from the moulding end toward a side away from the bent moulding surface;
the bottom extension surface overlaps with the end tangent plane, or is closer to the planar moulding surface than the end tangent plane; and
the guide position is located at the bottom extension surface when each slideable press head moves to the second position.

12. The attaching apparatus according to claim 11, wherein each slideable press head further has a slider connection surface, wherein
the slider connection surface is connected to an end, away from the bent moulding surface, of the bottom extension surface, and extends from the bottom extension surface in a direction facing away from the planar moulding surface; and
the guide position is located at a portion connected the bottom extension surface and the slider connection surface when each slideable press head moves to the second position.

13. The attaching apparatus according to claim 12, wherein the slider connection surface and the bottom extension surface have a rounded corner therebetween, and the contact end is a circular arc protrusion matched with the rounded corner.

14. The attaching apparatus according to claim 13, wherein a diameter of a circular arc of the contact end is equal to a difference between a diameter of the rounded corner and a thickness of the carrier film.

15. The attaching apparatus according to claim 8, wherein the guide mechanism includes two guide clamps arranged corresponding to the two slideable press heads, each guide clamp includes:
a guide member extending in a direction perpendicular to a movement direction of a slideable press head adjacent thereto, an end, proximate to the moulding surface, of the guide member being a contact end in contact with the carrier film when the guide mechanism moves to the moulding position.

16. The attaching apparatus according to claim 15, wherein each guide clamp further includes a connection member connected to an end, away from the contact end, of the guide member, wherein
the connection member extending from the guide member in a movement direction of the adjacent slideable press head away from another slideable press head.

17. The attaching apparatus according to claim 16, wherein each guide clamp further includes a fixing member extending in a direction parallel to the connection member, wherein
the fixing member is disposed on a surface, opposite to the guide member, of the connection member, and the fixing member cooperates with the connection member to clamp the carrier film.

18. The attaching apparatus according to claim 17, wherein at least one of the cover plate fixing part and each slideable press head is configured to be capable of moving toward another, and there is an attaching position where each slideable press head moves at a concave side of the curved cover plate for attaching in a motion path of the at least one of the cover plate fixing part and each slideable press head; and the guide member is located in a gap between the curved cover plate and each slideable press head when each slideable press head is located at the attaching position.

19. The attaching apparatus according to claim 18, wherein the connection member is located outside a whole of the cover plate fixing part and the curved cover plate when each slideable press head is located at the attaching position.

20. The attaching apparatus according to claim 1, wherein the cover plate fixing part is provided with a cover plate groove for accommodating the curved cover plate.

* * * * *